(12) United States Patent
Gente et al.

(10) Patent No.: US 10,927,914 B2
(45) Date of Patent: Feb. 23, 2021

(54) BRAKE LINING ARRANGEMENT, METHOD

(71) Applicant: Robert Bosch GmbH, Stuttgart (DE)

(72) Inventors: Christof Gente, Echern (DE); Peter Rothacher, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 15/993,191

(22) Filed: May 30, 2018

(65) Prior Publication Data
US 2018/0347655 A1 Dec. 6, 2018

(30) Foreign Application Priority Data

May 31, 2017 (DE) ...................... 10 2017 209 116.9

(51) Int. Cl.
*F16D 69/04* (2006.01)
*F16D 65/097* (2006.01)
*F16D 69/00* (2006.01)

(52) U.S. Cl.
CPC ...... *F16D 69/0408* (2013.01); *F16D 65/0979* (2013.01); *F16D 2069/002* (2013.01); *F16D 2069/0433* (2013.01); *F16D 2069/0441* (2013.01); *F16D 2069/0466* (2013.01); *F16D 2069/0491* (2013.01); *F16D 2200/0021* (2013.01); *F16D 2250/0061* (2013.01); *F16D 2250/0084* (2013.01)

(58) Field of Classification Search
CPC ............. F16D 69/0408; F16D 65/0979; F16D 2069/002; F16D 2069/0433; F16D 2069/0441; F16D 2069/0466; F16D 2069/0491; F16D 2200/0021; F16D 2250/0061; F16D 2250/0084

See application file for complete search history.

(56) References Cited

U.S. PATENT DOCUMENTS

| | | | | | |
|---|---|---|---|---|---|
| 3,767,018 | A | * | 10/1973 | Gordon | B29C 37/0082 188/250 G |
| 3,966,026 | A | * | 6/1976 | Fillderman | F16D 65/0006 188/73.37 |
| 4,146,118 | A | * | 3/1979 | Zankl | F16D 69/0408 188/250 G |
| 5,255,762 | A | * | 10/1993 | Beri | F16D 69/0416 188/234 |
| 5,816,370 | A | * | 10/1998 | Verbeeten | F16D 65/0006 188/73.37 |
| 6,431,331 | B1 | | 8/2002 | Arbesman | |

(Continued)

FOREIGN PATENT DOCUMENTS

| | | | | |
|---|---|---|---|---|
| EP | 0902210 A2 | * | 3/1999 | ........... F16D 65/092 |
| GB | 1341019 A | * | 12/1973 | ............. F16D 65/08 |

*Primary Examiner* — Melanie Torres Williams
(74) *Attorney, Agent, or Firm* — Maginot, Moore & Beck LLP

(57) ABSTRACT

A brake lining arrangement, in particular for a disk brake of a motor vehicle, has a rear plate and a friction lining that is connected to the rear plate. The rear plate has a bearing face on which the friction lining is placed. The rear plate also has a member configured for fastening the friction lining on the bearing face. The friction lining has at least one cutout that is configured as a blind bore. At least one connecting pin is arranged fixedly on the rear plate so as to project from the bearing face. The connecting pin is configured to engage at least substantially without play into the cutout.

16 Claims, 4 Drawing Sheets

(56) References Cited

U.S. PATENT DOCUMENTS

| | | |
|---|---|---|
| 7,222,701 B2 | 5/2007 | Pham |
| 7,249,483 B2 | 7/2007 | Pham |
| 7,886,881 B2 * | 2/2011 | Goldbach ............. F16D 65/092 |
| | | 188/250 D |
| 2004/0140165 A1 | 7/2004 | Pham |

* cited by examiner

BRAKE LINING ARRANGEMENT, METHOD

This application claims priority under 35 U.S.C. § 119 to patent application no. DE 10 2017 209 116.9, filed on May 31, 2017 in Germany, the disclosure of which is incorporated herein by reference in its entirety.

BACKGROUND

The disclosure relates to a brake lining arrangement, in particular for a disk brake of a motor vehicle, having a rear plate and having a friction lining which is connected to the rear plate, the rear plate having a bearing face, on which the friction lining is placed, and having means for fastening the friction lining on the bearing face.

Brake lining arrangements of the type mentioned at the outset are known from the prior art. For instance, patent specification U.S. Pat. No. 6,431,331 B1 describes a brake lining arrangement having a rear plate and a friction lining which is connected to the rear plate, the friction lining being placed on a bearing face of the rear plate. Hook-shaped fastening means which engage into the friction lining are configured on the bearing face of the rear plate in order to fasten the friction lining and the rear plate. Documents U.S. Pat. No. 7,222,701 B2, U.S. Pat. No. 7,249,483 B2 and US 2004/0140165 A1 describe similar brake lining arrangements. Moreover, it is known to connect the friction lining and the rear plate to one another by way of rivets or by way of adhesive bonding.

SUMMARY

It is provided according to the disclosure that the friction lining has at least one cutout which is configured as a blind bore, and that at least one connecting pin is arranged fixedly on the rear plate so as to project from the bearing face, which connecting pin engages at least substantially without play into the cutout, in particular radially. Here, "fixedly" means that the connecting pin is arranged captively on the rear plate. It is the advantage of the brake lining arrangement according to the disclosure that the friction lining can be connected in a stable manner to the rear plate in a particularly simple way. Here, the at least substantially play-free engaging of the connecting pin into the blind bore ensures a configuration/configuring capability of a positively locking connection which effectively prevents a release of the rear plate and the friction lining, in particular if further fastening means fail, such as for example adhesive. In addition, the blind bore can be configured in the friction lining in a simple way, for example by way of a drilling or pressing operation. In particular, the connecting pin therefore engages into the blind bore in a positively locking manner, in particular radially, preferably with the configuration of an interference fit.

It is provided in accordance with one preferred development of the disclosure that the connecting pin is pressed into the blind bore. The advantage here is that a play-free and therefore particularly stable positively locking connection is realized between the connecting pin and the blind bore or between the friction lining and the rear plate. As viewed in its longitudinal direction, the connecting pin is preferably pressed into the blind bore or is arranged in the blind bore at a depth or penetration depth of from 1 mm to 5 mm, particularly preferably 2 mm to 3 mm.

The connecting pin is preferably configured in one piece with the rear plate. This results in the advantage that the connecting pin is connected to the rear plate in a particularly stable manner. The risk of the connecting pin becoming detached from the rear plate and therefore the rear plate which is connected by means of the connecting pin and the friction lining becoming detached is particularly low as a result.

It is particularly preferably provided that the connecting pin is configured separately and is fastened to/in the rear plate. This has the advantage firstly that the rear plate can be produced particularly simply, in particular without the configuration of at least one connecting pin which is configured in one piece with it. Secondly, the advantage arises that the separately configured connecting pin can be produced inexpensively as a component which is, in particular, prefabricated, with the result that a production outlay for producing the brake lining arrangement overall is minimized. In order to fasten the separately configured connecting pin to/in the rear plate, a cutout or connecting pin cutout is preferably configured in the rear plate, in which cutout or connecting pin cutout the connecting pin can be arranged. The connecting pin cutout can be configured in the rear plate, for example, by way of a drilling or punching or cutting process (laser cutting or water jet cutting).

It is particularly preferably provided that the connecting pin is fastened in the rear plate in a positively locking, non-positive and/or integrally joined manner. This has the advantage that the, in particular, separately configured connecting pin is fastened or can be fastened in the rear plate in a stable, in particular captively, manner. This ensures the configuration of a particularly secure connection or fixing between the rear plate and the friction lining by way of the connecting pin. The connecting pin is preferably pressed into the rear plate, in particular into the connecting pin cutout. As an alternative or in addition, the connecting pin is adhesively bonded or screwed, or rotary friction welded or resistance welded into the rear plate.

It is preferably provided that at least one end section of the connecting pin, which end section faces the friction lining, and/or the blind bore are/is of cylindrical or conical configuration. The advantage here is that the end section of the connecting pin and/or the blind bore can be connected to one another particularly precisely, in particular with a precise fit. The end section of the connecting pin and the blind bore are preferably of complementary configuration. It is thus preferably provided, for example, that a conical configuration of the blind bore is complementary with respect to a conical configuration of the end section of the connecting pin.

In addition or as an alternative, it is preferably provided that the connecting pin projects from the rear plate on that side of the rear plate which faces away from the friction lining. As a result, on that side which faces away from the friction lining, the connecting pin has a section which can be used to fasten the connecting pin itself or further elements, such as for example spring elements, in particular clips or holding clips, and/or damping elements, in particular noise-damping elements, preferably washers.

Furthermore, it is preferably provided that at least the projecting section of the connecting pin has a cross section which differs from a circular shape. As a result, in particular, an anti-rotation safeguard is provided with a spring element or damping element which is of complementary configuration with respect to it, which anti-rotation safeguard ensures secure holding and orientation of the spring element and/or of the damping element. To this end, for example, the connecting pin can have a square cross section, a triangular cross section or an oval cross section in the projecting section. In accordance with a further embodiment, the connecting pin overall has a cross section which differs from a circular shape, with the result that this type of anti-rotation safeguard also acts on that end section of the connecting pin which is assigned to or faces the friction lining, and in the rear plate.

In accordance with one preferred embodiment of the disclosure, it is provided, moreover, that at least one spring element, in particular a holding clip, and/or damping element, in particular in the form of a washer, is pushed onto the projecting section and, in particular, is fastened to the projecting section of the connecting pin. Here, the abovementioned anti-rotation safeguard is particularly preferably configured between the spring element and/or damping element and the connecting pin.

Here, the connecting pin is preferably deformed plastically in order to fasten the spring element and/or the holder clip. To this end, in particular, the connecting pin is deformed in the manner of a rivet (riveted) on its projecting section, in order to lock the spring element and/or the damping element securely axially on the connecting pin or between the projecting end of the connecting pin and the rear plate by way of being shaped radially. This ensures a simple and inexpensive fastening of the spring element and/or the damping element.

It is provided in accordance with one preferred development of the disclosure that the connecting pin has at least one radially projecting or one radially inwardly configured contour element on a circumferential wall. The advantage here is that the contour element additionally stabilizes the connection between the connecting pin and the blind bore and/or between the connecting pin and the connecting pin cutout, and additionally prevents a release of the friction lining and the rear plate. Here, the radial projection of the contour element or the configuration of the contour element radially to the inside brings about, in particular, an increase in the surface area which interacts between the connecting pin and the rear plate, with the result that, in particular, a mechanical force, in particular a frictional force, additionally acts here or is at least increased here. The at least one contour element is preferably configured on the circumferential wall of an end section of the connecting pin, in particular the end section which is assigned to the rear plate.

The contour element is preferably a punch mark or a notch. The advantage here is that the contour element has a shape which can be produced in a simple way. The punch mark, notch and/or else a knurled portion can be configured, for example, by way of milling, punching or notching of the circumferential wall of the connecting pin. The contour element is optionally configured as a conical deformation of at least one end section of the connecting pin, in particular of the end section which is assigned to the rear plate.

It is particularly preferably provided that the rear plate and the friction lining are adhesively bonded to one another. This results in the advantage that the rear plate and the friction lining are additionally secured by way of an integrally joined connection to one another. Releasing of the friction lining from the rear plate is therefore additionally prevented.

The method for producing a brake lining arrangement, in particular for a disk brake of a motor vehicle, is distinguished by the features of disclosure. It is provided here that a rear plate is connected to a friction lining, a bearing face being configured on/in the rear plate, on which bearing face the friction lining is placed. The friction lining is fastened on the bearing face. Furthermore, it is provided that at least one cutout which is configured as a blind bore is configured in the friction lining, at least one connecting pin being arranged fixedly on the rear plate so as to project from the bearing face, which connecting pin engages at least substantially without play into the cutout. The abovementioned advantages result from this.

Further advantages and preferred features result, in particular, from the above-described text and from the claims.

BRIEF DESCRIPTION OF THE DRAWINGS

In the following text, the disclosure is to be described in greater detail using the drawings, in which.

DETAILED DESCRIPTION

Figure 1:
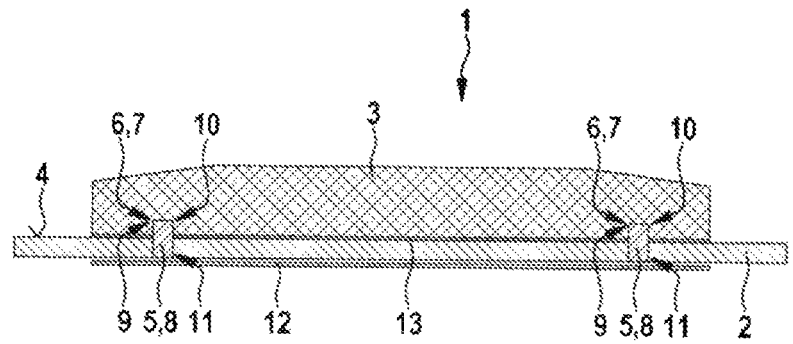
FIG. 1 shows a brake lining arrangement in a simplified cross-sectional illustration.

FIG. 1 shows a brake lining arrangement 1, in particular for a disk brake of a motor vehicle, having a rear plate 2 and having a friction lining 3 or friction means which is connected to the rear plate 2. The rear plate 2 is preferably manufactured from steel or iron. The friction lining 3 is preferably manufactured from a composite material which comprises, for example, metals, fibers, abrasive materials, lubricants, carbon, graphite, fillers and/or synthetic resins. In the case of a braking operation of a vehicle, the friction lining 3 is brought into an operative connection with a brake disk (not shown here) of the disk brake of the motor vehicle, with the result that the motor vehicle is braked by means of the mechanical friction which is brought about in the process. The friction lining 3 is preferably of mechanically rigid or stiff configuration, in order to ensure a high mechanical resilience during the braking operation or the operative connection.

The rear plate 2 has a bearing face 4, onto which the friction lining 3 is placed. In addition, the brake lining arrangement 1 has means 5 for fastening the friction lining 3 on the bearing face 4. The friction lining 3 has at least one cutout 7 which is configured as a blind bore 6. At least one connecting pin 8 is arranged fixedly on the rear plate 2 so as to project from the bearing face 4, which connecting pin 8 engages without play into the blind bore 6 in the present case, and is preferably pressed into the blind bore 6.

An end section 9 of the connecting pin 8, which end section 9 faces the friction lining 3, and the blind bore 6, in particular that region 10 of the blind bore 6 which faces the end section 9 of the connecting pin 8, are in each case of cylindrical configuration in the present case, with the result that a connectibility of the connecting pin 8 and the friction lining 3 is ensured, which connectibility has an accurate fit and is therefore particularly stable. As an alternative, the end section 9 and the blind bore 6 or that region 10 of the blind bore 6 which faces the end section 9 are of conical configuration.

In accordance with the exemplary embodiment which is shown here, the connecting pin 8 is of separate configuration and is arranged in a positively locking manner with the rear plate 2, in particular in a connecting pin cutout 11 or through opening which is configured in the rear plate 2, in particular is pressed into it. The pressing of the connecting pin 8 into the connecting pin cutout 11 advantageously ensures a play-free and particularly secure positively locking connection of the connecting pin 8 to the rear plate 2. The configuration of the connecting pin cutout 11 in the rear plate 2 preferably takes place by way of a punching or drilling method. Laser cutting, milling or grinding can also be carried out to this end.

As an alternative, the connecting pin 8 is configured in one piece with the rear plate 2. Machining of the bearing face 4 of the rear plate 2, for example by means of a material-removing method, in particular a milling method, preferably takes place in order to configure the connecting pin 8 in one piece with the rear plate 2.

The brake lining arrangement 1 optionally additionally has a damping unit 12 which is arranged on a side of the rear plate 2, which side faces away from the friction lining 3. The damping unit 12 is, for example, a film or a metal sheet, and is configured to reduce or damp a formation of noise in the case of a braking operation.

In addition to the fastening of the friction lining 3 and the rear plate 2 by way of the connecting pins 8, it is optionally provided to adhesively bond the rear plate 2 and the friction lining 3 to one another by way of an adhesive medium 13, an adhesive layer in the present case.

Figure 2A:
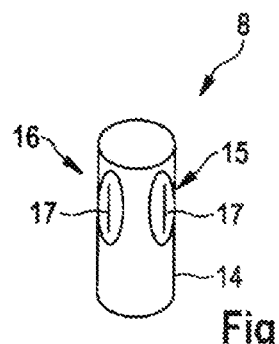
FIGS. 2A to 2D show a connecting pin in accordance with a first, a second and a third exemplary embodiment.

FIG. 2A shows a connecting pin 8 of cylindrical configuration in accordance with a first exemplary embodiment. The connecting pin 8 is manufactured, for example, from a metal and preferably has an at least substantially cylindrical, in particular circular, cross section.

In the present case, the connecting pin 8 has at least one radially inwardly protruding contour element 15 (in the present case, a notch) on a circumferential wall 14. The contour element 15 is preferably configured on the circumferential wall 14 of an end section 16 of the connecting pin 8, which end section 16 is assigned to the rear plate 2. As an alternative, the contour element 15 is configured on the entire circumferential wall 14.

In the present case, the notching has a plurality of notches 17 which are arranged, in particular, in a manner which is distributed uniformly over the circumference of the connecting pin 8. In the present case, a respective notch 17 extends parallel to a longitudinal extent of the connecting pin 8, and has a predefinable length. The contour element 15 (in the present case, the notching) ensures an additional stabilization of the connection or fastening of the connecting pin 8 in the rear plate 2, in particular of the connecting pin 8 which is pressed into the rear plate 2.

Figure 2B:
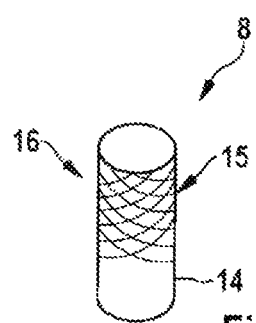

FIG. 2B shows a second exemplary embodiment of the connecting pin 8 of cylindrical configuration. In contrast to the first exemplary embodiment, the contour element 15 is configured as a knurled portion here. During pressing of the connecting pin 8 into the rear plate 2, said knurled portion ensures particularly stable anchoring of the connecting pin 8 in the rear plate 2.

Figure 2C:
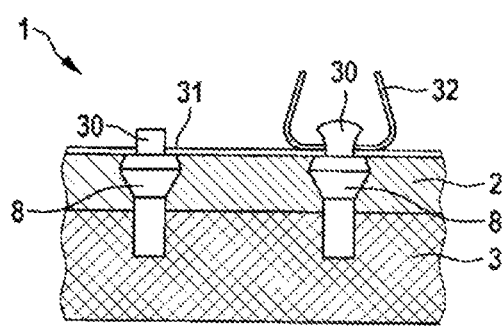
Figure 2D:
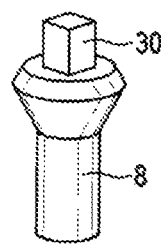

FIGS. 2C and 2D show a third exemplary embodiment of the brake lining arrangement 1, in the case of which the connecting pin 8 projects with its end which faces away from the friction lining 3 beyond the rear plate 2. To this end, FIG. 2C shows the brake lining arrangement 1 with two connecting pins 8 in a further sectional illustration. It can be seen here that, in the present case, the respective connecting pin 8 has an increasing diameter within the rear plate 2 in the direction of the friction lining 3 with respect to the brake lining 3, which increasing diameter merges into a decreasing diameter in the direction of the friction lining 3. As a result, the connecting pin 8 is held securely axially in the rear plate 2.

As shown in FIG. 2D which shows a perspective illustration of a single one of the connecting pins 8 which are shown in FIG. 2C, the projecting section 30 has a cross-sectional contour which differs from a circular shape. In the present case, the cross section of the projecting section 30 is of square configuration. This shape serves as an anti-rotation safeguard if a further element, such as for example a damping element in the form of a washer, is pushed axially onto the projecting section 30, as shown in FIG. 2C.

In accordance with the exemplary embodiment of FIG. 2C, a damping element 31 is pushed onto the two projecting sections 30 of the connecting pins 8. In particular, the damping element 31, in particular the noise damping element, forms the abovementioned damping unit 12. To this end, the damping unit 31 has cutouts which correspond to the section 30, with the result that an anti-rotation safeguard is produced between the section 30 and the damping element 31. Moreover, a spring element 32 in the form of a clip or holding clip is pushed onto the section 30 of the connecting pin 8 which is arranged on the right in the figure, with the result that the damping element 31 lies between the holding clip and the rear plate 2. In order to secure the spring element 32 and the damping element 31 on the rear plate 2, it is provided in the present case that the projecting section 30 of the connecting pin 8 which is arranged on the right in the figure is deformed plastically, for example in the manner of a rivet, in order to secure the spring element 32 and the damping element 31 axially on the connecting pin 8 as a result. It goes without saying that only the spring element 32 can also be arranged without the damping element 31 on the right-hand connecting pin 8. All conceivable combinations comprising the damping element 31 and the spring element 32 on in each case one of the pins 8 are in principle conceivable. In particular, it can also be provided that a plurality of damping elements 31 and/or a plurality of spring elements 32 are arranged on in each case one of the sections 30.

Figure 3A:
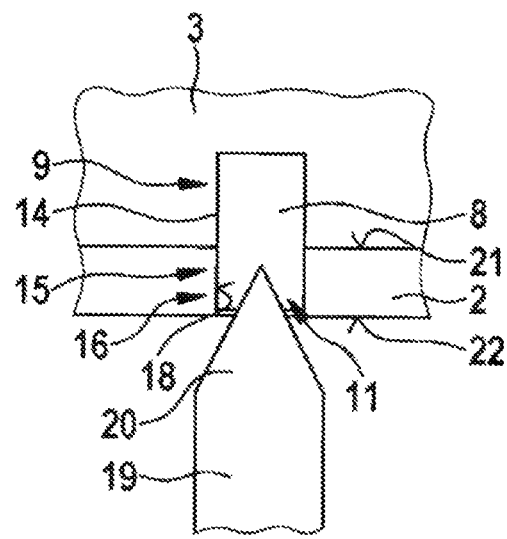
FIGS. 3A to 3C show a connecting pin which is connected to a rear plate of the brake lining arrangement, in accordance with a fourth, fifth and sixth exemplary embodiment.

FIG. 3A shows a connecting pin 8 which is fastened in a rear plate 2 in accordance with a fourth exemplary embodiment. Here, the connecting pin 8 has a cylindrical shape and a contour element 15 which is configured as a punch mark on an end section 16 of its circumferential wall 14, which end section 16 is assigned to the rear plate 2. Here, the contour element 15 interacts with an inner circumferential wall 18 of the connecting pin cutout 11, with the result that the connecting pin 8 can be fastened, in particular clamped, particularly effectively in the connecting pin cutout 11 or the rear plate 2 in a positively locking manner. The inserting, in particular the pressing, of the connecting pin 8 into the rear plate 2 preferably takes place by means of a ram 19 or plunger. In the present case, the ram 19 has an end face 20 of pyramid-shaped or conical configuration. As an alternative, the end face 20 is curved or flat, for example.

As an alternative or in addition, the connecting pin 8 is riveted or can be riveted into the rear plate 2, the connecting pin 8 and/or the rear plate 2 preferably being of deformable configuration in order to produce a riveted connection. To this end, for example, the connecting pin 8 is first of all arranged in or pressed into the rear plate 2, at least one end section 9, 16 of the connecting pin 8, which end section 9, 16 protrudes out of the rear plate 2, subsequently being deformed in such a way that a collar is configured which lies on a surface, in particular a front side surface 21 and/or rear side surface 22 of the rear plate 2.

Figure 3B:
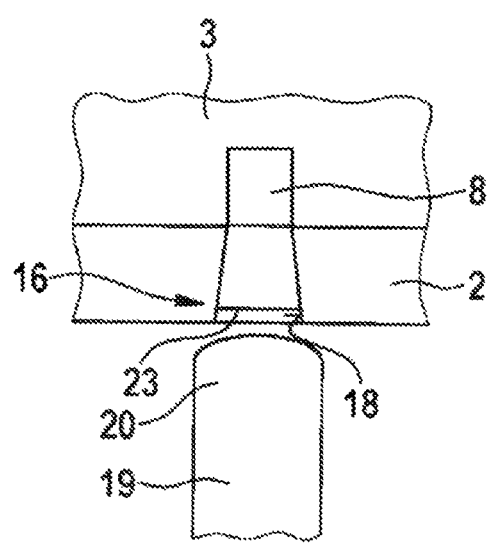

FIG. 3B shows a connecting pin 8 which is fastened in a rear plate 2 in accordance with a fifth exemplary embodiment. In the present case, the connecting pin 8 has an end section 16 which faces or is assigned to the rear plate 2 and is conically shaped or widened in a cone-shaped manner. In addition, an end face 23 of the end section 16 is preferably of flat configuration. In the present case, the ram 19 has an outwardly curved end face 20.

The connecting pin cutout 11 preferably has a constant diameter, the diameter of the connecting pin cutout 11 being smaller than the diameter of the connecting pin 8, in particular in the region of the conically shaped end section 16. The connecting pin cutout 11 is therefore of undersized configuration in comparison with the connecting pin 8. During a pressing of the connecting pin 8 into the rear plate 2, a radially and axially acting force component, in particular, on the inner circumferential wall 18 of the connecting pin cutout 11 results from the conically shaped end section 16, which force component deforms the inner circumferential wall 18 of the connecting pin cutout 11 radially and axially. This results in a particularly stable positively locking fastening or anchoring of the connecting pin 8 in the connecting pin cutout 11 or rear plate 2.

As an alternative, the inner circumferential wall 18 of the connecting pin cutout 11 or the rear plate 2 has a conical deformation which is of complementary configuration with respect to the conical deformation of the connecting pin 8.

Figure 3C:
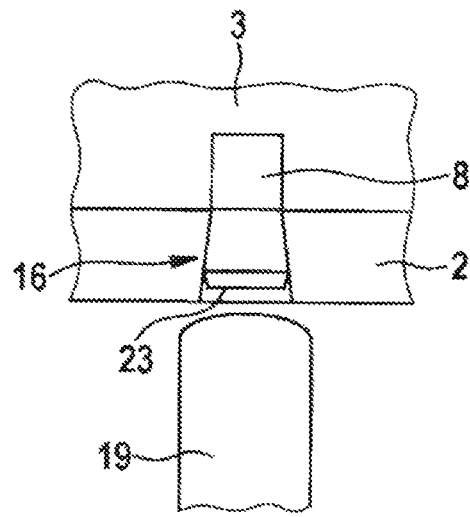

FIG. 3C shows a connecting pin 8 which is fastened in a rear plate 2 in accordance with a sixth exemplary embodiment. In contrast to the second exemplary embodiment of FIG. 3B, the connecting pin 8, in particular the end section 16 of the connecting pin 8, has an end face 23 of trapezoidal configuration.

As an alternative or in addition to the pressing of the connecting pin 8 into the rear plate 2, it is provided to adhesively bond the connecting pin 8 to the rear plate 2, in particular the inner circumferential wall 18 of the connecting pin cutout 11. To this end, an adhesive medium 13 or adhesive is applied on the rear plate 2 and/or inner circumferential wall 18 either before or after the introduction of the connecting pin 8 into the rear plate 2. The adhesive medium 13 is preferably sprayed on, rolled on or applied by way of a dipping or pouring method. Spraying on has the advantage that it can also coat three-dimensional structures, that is to say it can also coat a connecting pin 8 which has already been introduced or pressed in. Rolling on is advantageous in the case of an application of the adhesive medium 13 before a connecting pin 8 is introduced or pressed into the rear plate 2.

In order to connect the friction lining 3 and the rear plate 2, the friction lining 3 is preferably pressed onto the rear plate 2 at a predefinable temperature, and is subsequently cross-linked or hardened, for example, in an oven at a further predefinable temperature.

The disclosure is not restricted to the described exemplary embodiments. Rather, all proposed embodiments and possibilities for fastening and/or configuring the connecting pin 8 can be combined.

Figure 4A:
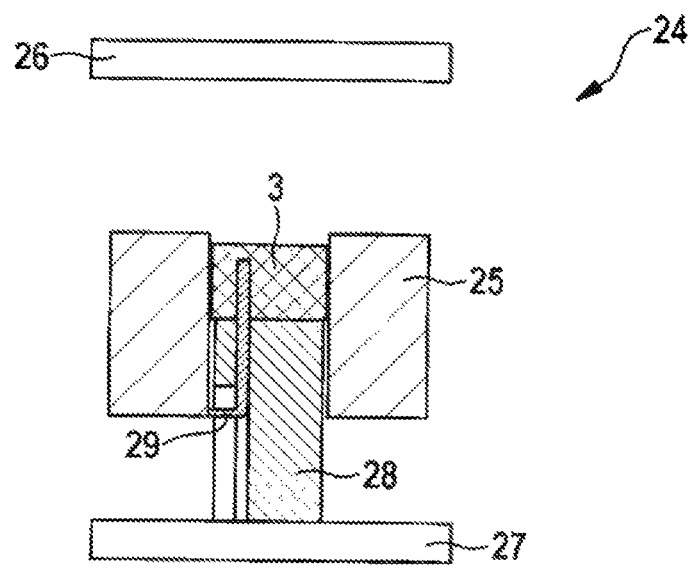
FIGS. 4A to 4C show a method for configuring a blind bore in a friction lining of the brake lining arrangement.
Figure 4B:
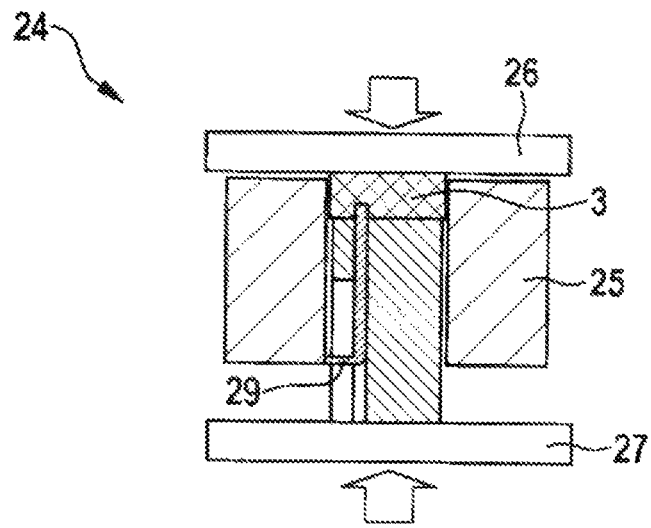
Figure 4C:
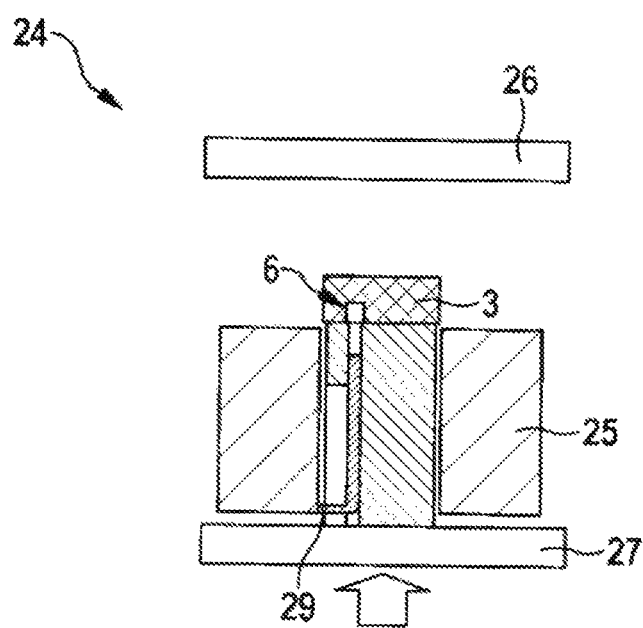

By way of example, FIGS. 4A to 4C describe a method for producing the friction lining 3.

To this end, in accordance with FIG. 4A, a pressing tool 24 or mold tool is filled with the material, in particular composite material, of the friction lining 3. In the present case, the pressing tool 24 has a wall 25 and a first pressing plate 26 and a second pressing plate 27, a pressing ram 28 being arranged on the second pressing plate 27. In addition, at least one pin 29 for configuring a blind bore 6 is guided in the pressing ram 28, the pin 29 protruding into the material or composite material.

In accordance with FIG. 4B, after filling of the pressing tool 24, the first and the second pressing plate 26, 27 are moved toward one another, that is to say in each case in the direction of the wall 25, with the result that the material is pressed into a friction lining shape.

FIG. 4C shows that the first pressing plate 26 is subsequently moved away from the wall 25 of the pressing tool 24, whereas the second pressing plate 27 is pushed further in the direction of the wall 25. Here, the pin 29 is guided out of the material, with the result that a blind bore 6 is configured in the friction lining 3. The pin 29 can, for example, be connected rigidly to the pressing tool 24 or mold or can be actuated in an active manner.

The brake lining arrangement 1 has the advantage that it can be produced in a simple way, in particular inexpensively, and ensures a secure connection between the friction lining 3 and the rear plate 2. Here, in particular, as many blind bores 6 as desired can be configured in the friction lining 3 in a predefinable arrangement, with the result that brake lining arrangements 1 can be produced which are adapted individually, in particular are adapted individually to a corresponding motor vehicle.

What is claimed is:

1. A brake lining arrangement, comprising:
    a rear plate having a bearing face;
    a friction lining arranged on the bearing face and connected to the rear plate, the friction lining defining at least one cutout that is configured as a blind bore; and
    at least one connecting pin arranged fixedly on the rear plate and projecting from the bearing face, the connecting pin engaging at least substantially without play into the cutout with an interference fit so as to connect the friction lining to the rear plate,
    wherein the connecting pin is connected to the rear plate in such a way that the connecting pin remains captively connected to the rear plate upon removal of the friction lining from the rear plate,
    wherein the connecting pin projects from the rear plate on a side of the rear plate that faces away from the friction lining, and
    wherein the brake lining arrangement further comprises one or more of a damping element and a spring element, the one or more of the damping element and the spring element being pushed onto a projecting section of the connecting pin and fastened to the projecting section.

2. The brake lining arrangement according to claim 1, wherein the connecting pin is pressed into the blind bore with the interference fit so as to connect the friction lining to the rear plate.

3. The brake lining arrangement according to claim 1, wherein the connecting pin is integrally formed in one piece with the rear plate.

4. The brake lining arrangement according to claim 1, wherein the connecting pin is formed separately from the rear plate and is fastened either to or in the rear plate.

5. The brake lining arrangement according to claim 4, wherein the connecting pin is fastened to the rear plate in one or more of a positively locking manner, an integrally joined manner, and a non-positive manner.

6. The brake lining arrangement according to claim 1, wherein the connecting pin has at least one end section that faces the friction lining, and wherein the end section and the blind bore have one of more of a cylindrical configuration and a conical configuration that engage with the interference fit.

7. The brake lining arrangement according to claim 1, wherein a cross-section of the projecting section of the connecting pin, taken perpendicular to a central axis of the connecting pin, is noncircular.

8. The brake lining arrangement according to claim 1, wherein the connecting pin is deformed plastically to respectively fasten the one or more of the damping element and the spring element.

9. The brake lining arrangement according to claim 1, wherein the rear plate and the friction lining are adhesively bonded to one another.

10. The brake lining arrangement according to claim 1, wherein the brake lining arrangement is configured for a disk brake of a motor vehicle.

11. The brake lining arrangement according to claim 1, wherein the interference fit is formed by radial engagement between a cylindrical outer circumferential wall of the connecting pin and a cylindrical inner circumferential wall of the cutout.

12. A brake lining arrangement, comprising:
a rear plate having a bearing face;
a friction lining arranged on the bearing face and connected to the rear plate, the friction lining defining at least one cutout that is configured as a blind bore; and
at least one connecting pin arranged fixedly on the rear plate and projecting from the bearing face, the connecting pin engaging at least substantially without play into the cutout with an interference fit so as to connect the friction lining to the rear plate,
wherein the connecting pin is connected to the rear plate in such a way that the connecting pin remains captively connected to the rear plate upon removal of the friction lining from the rear plate, and
wherein the connecting pin has at least one radially projecting or radially inwardly protruding contour element on a circumferential wall.

13. A brake lining arrangement, comprising:
a rear plate having a bearing face;
a friction lining arranged on the bearing face and connected to the rear plate, the friction lining defining at least one cutout that is configured as a blind bore; and
at least one connecting pin arranged fixedly on the rear plate and projecting from the bearing face, the connecting pin engaging at least substantially without play into the cutout with an interference fit so as to connect the friction lining to the rear plate,
wherein the connecting pin has at least one radially projecting or radially inwardly protruding contour element on a circumferential wall, and
wherein the contour element has a punch mark or a notch.

14. The brake lining arrangement according to claim 13, wherein the connecting pin is connected to the rear plate in such a way that the connecting pin remains captively connected to the rear plate upon removal of the friction lining from the rear plate.

15. A method for producing a brake lining arrangement for a disc brake of a motor vehicle, comprising:
fixedly arranging at least one connecting pin on a rear plate so as to project from a bearing face of the rear plate; and
engaging the at least one connecting pin that projects from the bearing face at least substantially without play into a cutout, which is defined in a friction lining and configured as a blind bore, so as to form an interference fit that connects the friction lining to the rear plate,
wherein the fixedly arranging the at least one connecting pin on the rear plate includes arranging the connecting pin in such a way that the connecting pin is captively connected to the rear plate before the engaging of the at least one connecting pin into the cutout,
wherein the connecting pin projects from the rear plate on a side of the rear plate that faces away from the friction lining, and
wherein the method further comprises pushing one or more of a damping element and a spring element onto a projecting section of the connecting pin and fastening the one or more of the damping element and the spring element to the projecting section.

16. The method according to claim 15, wherein the engaging of the at least one connecting pin into the cutout includes radially engaging a cylindrical outer circumferential wall of the connecting pin and a cylindrical inner circumferential wall of the cutout.

* * * * *